United States Patent [19]

Yoshida et al.

[11] Patent Number: 4,658,796

[45] Date of Patent: Apr. 21, 1987

[54] SYSTEM FOR PREVENTING LOSS OF FUEL DUE TO EVAPORATION

[75] Inventors: Shigeru Yoshida, Toyota; Kenji Koeda, Nagoya, both of Japan

[73] Assignees: Aisan Industry Co., Ltd., Ohbu; Toyota Jidosha Kabushiki Kaisha, Toyota, both of Japan

[21] Appl. No.: 778,734

[22] Filed: Sep. 23, 1985

Related U.S. Application Data

[63] Continuation of Ser. No. 585,862, Mar. 2, 1984, abandoned.

[30] Foreign Application Priority Data

Mar. 9, 1983 [JP] Japan .................................. 58-39839

[51] Int. Cl.⁴ ........................ F02M 39/00; B01D 53/04

[52] U.S. Cl. .................................... 123/519; 123/516; 55/319; 55/387; 55/385 B

[58] Field of Search ............... 123/514, 516, 518, 519, 123/520, 521; 55/387, 385 B, 319

[56] References Cited

U.S. PATENT DOCUMENTS

| | | | |
|---|---|---|---|
| 1,269,787 | 6/1918 | Church | 123/516 |
| 2,599,699 | 10/1952 | Dilworth | 123/514 |
| 3,675,634 | 7/1972 | Tatsutomi | 123/519 |
| 3,727,597 | 4/1973 | Hensler | 123/519 |
| 4,173,207 | 11/1979 | Hiramatsu | 123/519 |
| 4,308,840 | 1/1982 | Hiramatsu | 123/519 |
| 4,386,947 | 6/1983 | Mizuno | 55/387 |
| 4,452,213 | 6/1984 | Duprez | 123/516 |
| 4,572,394 | 2/1986 | Tanahashi | 55/387 |

FOREIGN PATENT DOCUMENTS

| | | | |
|---|---|---|---|
| 0032010 | 3/1968 | Japan | 123/519 |
| 53-19729 | 6/1978 | Japan | 123/519 |
| 55-45748 | 11/1980 | Japan | 123/519 |
| 0164763 | 12/1980 | Japan | 123/518 |

*Primary Examiner*—Carl Stuart Miller

*Attorney, Agent, or Firm*—Cushman, Darby & Cushman

[57] ABSTRACT

A system for preventing loss of fuel due to evaporation in internal combustion engine, particularly in automotive engine. The system has a casing accommodating a fuel gas absorbent. A separator chamber adapted to separate the liquid phase and gaseous phase of the fuel from each other is disposed in a passage through which a tank port leading from a fuel tank is communicated with the absorbent. The passage is so constructed as to permit only the gaseous phase of the fuel to be sent to the absorbent.

2 Claims, 6 Drawing Figures

SYSTEM FOR PREVENTING LOSS OF FUEL DUE TO EVAPORATION

BACKGROUND OF THE INVENTION

This is a continuation of application Ser. No. 585,862 filed Mar. 2, 1984 which was abandoned upon the filing hereof.

The present invention relates to a system for use in an internal combustion engine and adapted to collect the fuel which has been evaporated from the fuel supplying system of the engine and returning the fuel to the fuel tank or the carburetor, thereby to prevent pollution of air and to prevent the loss of fuel due to evaporation.

In the internal combustion engines, the evaporation of fuel from the constituents of the fuel supply system such as the fuel tank, carburetor and so forth takes place inevitably. If the fuel gas is relieved directly into the atmosphere, the atmosphere is polluted by HC contained by the fuel gas.

To obviate this problem, various systems have been proposed to collect the fuel gas, particularly in connection with vehicle engines. Most of these known systems incorporate a canister incorporating a fuel absorbent. This type of fuel collecting system has encountered various problems. Namely, when the vehicle runs along a tight corner, the fuel in the fuel tank inconveniently comes into the passage leading to the canister due to inertia. In addition, the fuel which has been evaporated from the fuel tank in the day time and stored in the passage leading to the canister is liquefied in the night time and the liquefied fuel undesirably flows into the canister accompanying the newly fuel gas. The liquid phase of the fuel thus introduced into the canister undesirably attaches to the absorbent in the canister. Consequently, the pores of the absorbent are clogged with the high-boiling-point component of the liquid fuel to deteriorate the performance of the absorbent. Consequently, the fuel vapor trapping function of the canister is impaired to allow the pollution of the atmosphere.

BRIEF SUMMARY OF THE INVENTION

Accordingly, it is a primary object of the invention to provide a system for preventing loss of fuel due to evaporation, improved to overcome the above-described problems of the prior art.

To this end, according to the invention, there is provided a system for preventing loss of fuel due to evaporation comprising: a casing accommodating a fuel gas absorbent and provided with a tank port communicating with a fuel tank; a passage defined in the casing and providing a communication between the tank port and the absorbent; and a separator chamber disposed in the passage and adapted to separate the liquid phase of the fuel from the gaseous phase of the fuel, the passage being so constructed as to permit only the gaseous phase of the fuel to flow towards the absorbent.

In a preferred form of the invention, in order to prevent the liquid phase of the fuel from coming into contact with the absorbent, the system is provided with a passage formed in the bottom of the separator chamber and opening in a portion isolated from the absorbent, and a float valve normally closing the opening of the passage, the float valve being adapted to open the passage when a predetermined liquid level is reached in the separator chamber.

With these arrangement, it is possible to obtain a durable system for preventing loss of fuel due to evaporation, without imparing the function of the canister.

According to the invention, therefore, it is possible to prevent the liquid fuel from coming into the absorbent, so that the deterioration of the absorbent due to clogging of the pores by the high-boiling-point component of the liquid fuel and the resultant impairment of the fuel vapor trapping function are avoided. Consequently, it becomes possible to make the most of the fuel absorbent and, hence, to obtain a durable system for preventing loss of fuel due to evaporation improved to eliminate any unfavourable effect on the engine.

If the rate of flow of the liquid fuel into the canister exceeds the rate of reduction of the amount of liquid fuel in the lower part of the separator chamber due to natural evaporation, the liquid fuel may flow into contact with the absorbent through the first passage. According to the preferred form of the invention, however, this does not matter substantially because the float valve is opened to relieve the liquid fuel from the separator chamber before the liquid level in the latter reaches the level of the opening of the first passage adjacent to the separator chamber. It is thus possible to perfectly eliminate the flooding of the absorbent by the liquid fuel The above and other objects, features and advantages of the invention will become clear from the following description of the preferred embodiments taken in conjunction with the accompanying drawings.

DESCRIPTION OF THE PREFERRED EMBODIMENTS

Figure 1:
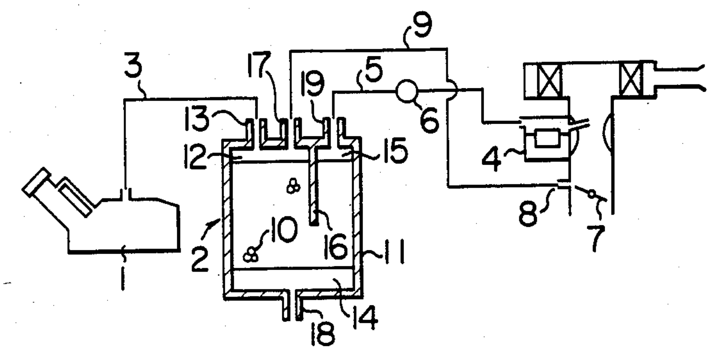
FIG. 1 PRIOR ART
FIG. 1 is a sectional view of a conventional system for preventing loss of fuel due to evaporation.

FIG. 1 shows a typical example of a system for preventing air pollution by fuel gas, as well as the loss of fuel due to evaporation. This system has a casing 11 incorporating a fuel gas absorbent 10. A check valve for controlling the flow of fuel gas from a fuel tank 1 to a casing 11 is disposed in the vicinity of or within a tank port 13 communicating with the fuel tank 1. Another check valve for controlling the flow of the fuel gas from the casing into the internal combustion engine is disposed in the vicinity of or within a purge port 17 communicating with the internal combustion engine. This system is shown, for example, in Japanese Patent Publication Nos. 19729/1978 and 45748/1980.

In the operation of the known system of the type explained above, the fuel gas is temporarily stored in the absorbent 10 due to the difference between the internal pressure of the fuel tank 1 or the internal pressure of the float chamber of a carburetor and the atmospheric port 18 provided in the casing 11. During the operation of the internal combustion engine, the absorbent relieves the fuel gas into the intake passage of the engine so that the fuel gas is inducted into and burnt in the combustion chamber of the engine, thereby to prevent the air pollution due to the emission of HC to the atmosphere.

Figure 2:
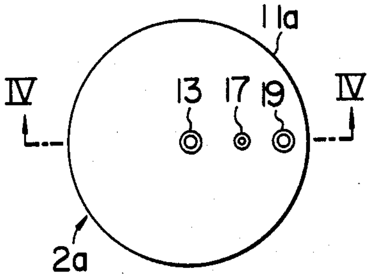
FIGS. 2 and 3 are plan views of two different embodiments of the invention.
Figure 3:
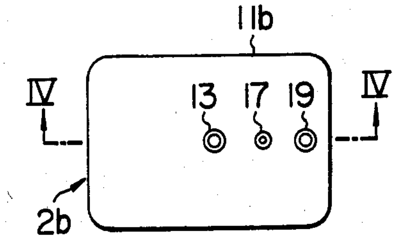

FIGS. 2 and 3 are plan views of canisters 2a and 2b incorporated in two different embodiments of the invention. More specifically, the canister shown in FIG. 2 has a cylindrical casing 11a, while the canister 2b shown in FIG. 3 has a casing 11 of a substantially rectangular planar outer configuration. Each of the casings 11a and 11b is provided at its upper portion with an outer vent port 19 communicating with the float chamber 4 of the carburetor, a purge port 17 communicating with an fuel gas pick-up port 8 disposed at the upstream side of the throttle valve 7, and a tank port 13 communicating with the fuel tank 1.

Figure 4:
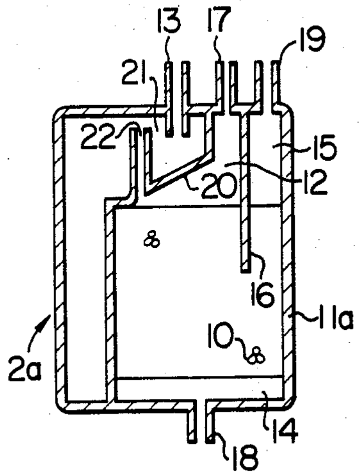
FIG. 4 is a sectional view taken along the lines IV—IV of FIGS. 2 and 3.

FIG. 4 is a vertical sectional view of the canister showing the internal structure of the same. As will be seen from this Figure, the outer vent port 19 opens in a third diffusion chamber 15 defined at the inlet side of the casing, while the purge port 17 opens into a first diffusion chamber 12 of the inlet side separated from the third diffusion chamber 15 by means of a first partition wall 16 having one end embedded in the absorbent 10. A second diffusion chamber 14 of outlet side is defined between the lower end of the absorbent 10 and the bottom of the casing 14. The second diffusion chamber 14 is communicated with the atmosphere through a first atmospheric port 18 formed in the casing lla.

The passage in the tank port 13 is communicated with the first diffusion chamber 12 of the inlet side.

In addition to these structural features which are common to those of the known systems, the system of the invention has the following features.

Namely, in the system of the invention, a second partition wall 20 connected at its bot ends to the walls of the casing lla is disposed to separate the first diffusion chamber 12 of the inlet side from the opening of the tank port 13 into the casing lla, thereby to form, in cooperation with the wall of the casing lla, a separator chamber 21 to which the tank port 13 opens. A first passage 22 formed through the thickness of the second partition wall 20 opens to a comparatively upper portion of the separator chamber 21.

In the embodiment shown in FIG. 4, the fuel gas formed as a result of the fuel evaporation in the fuel tank 1 is introduced into the separator chamber 21 through the first fuel gas passage 3 and past the tank port 13 formed in the canister 2a. The fuel gas is then introduced through the first passage 22 opening to an upper portion of the separator chamber 21 into the first diffusion chamber 12 of the inlet side and is diffused in this chamber 12 so as to be trapped by the absorbent 10. Any liquid phase of the fuel, which has been undesirably forced into the first fuel gas passage 3 due to inertia when the vehicle runs along a tight corner or liquefied in the night time, is fed into the separator chamber 21 accompanying the fuel gas. Due to the difference in the specific weight, the fuel gas stagnates in the upper portion of the separator chamber so as to be trapped by the absorbent 10 through the first passage 22, while the liquid phase of the fuel is accumulated in the lower portion of the separator chamber. However, the accumulated liquid phase of the fuel is gradually evaporated due to a rise in the ambient air temperature around the canister, and the fuel gas generated as a result of this evaporation is also sent through the first passage 22 into the first diffusion chamber 12 so as to be absorbed by the absorbent 10. Thus, the separator chamber 21 serves as a separator for separating the gaseous phase and the liquid phase of the fuel from each other.

The fuel gas coming from the float chamber 4 of the carburetor flows through the second fuel gas passage 5 past a stop valve 6 which opens when the engine does not operate and comes into contact with the absorbent 10 through the outer vent port 19 in the canister 2a so as to be trapped by the absorbent 10.

As the engine is started, fresh air is inducted through the first atmospheric port 18 by the intake vacuum acting on the purge port 17. Consequently, the fuel gas which has been trapped by the canister 2a leaves the canister 2a and is let to flow into the intake passage together with the fresh air, through the purge port 17 and the mixture passage 9 past the fuel gas pick-up port 8 formed in the carburetor.

Figure 5:
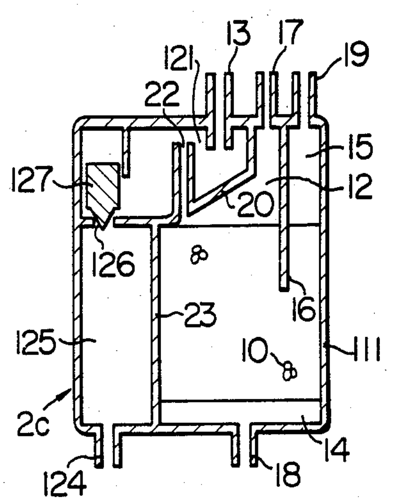
FIG. 5 is a vertical sectional view of a third embodiment of the invention.

FIG. 5 shows a third embodiment which is a modification of the embodiment shown in FIG. 4.

This third embodiment incorporates a liquid reservoir 125 which is separated by a third partition wall 23 from the absorbent 10 and provided at its bottom with an outlet port 124 which is communicated with the liquid part of.the fuel tank. A second passage 126 communicating with the liquid reservoir 125 is provided at the bottom of the separator chamber 121. The inlet side of the second passage 126 adjacent to the separator chamber is closed by a float valve 127 which normally takes the closing position but opens the second passage 126 when a predeter mined liquid level is reached in the separator chamber 121.

According to this arrangement, the liquid fuel which has been introduced into the canister 2c together with the fuel gas and separated from the latter in the separator chamber 121 is stored in the separator chamber 121 and, as a predetermined liquid level is reached in the latter, the float valve 127 is opened to let the liquid phase of the fuel go out of the canister through the outlet port 124 formed in the bottom of the liquid fuel reservoir. Consequently, the undesirable wetting of the absorbent by the liquid phase of the fuel is avoided advantageously.

A fourth embodiment of the invention will be described hereinunder with specific reference to FIG. 6.

In this embodiment, the canister 2d has a casing accommodating the absorbent 10 and provided at the bottom thereof with a tank port 213 communicating with the fuel tank 1. An outlet port 224 communicating with the liquid portion in the fuel tank opens to the lowermost portion of the inlet side first diffusion chamber 212 to which the tank port 213 opens. A float valve 227 associated with the opening of the outlet port 224 is adapted to normally close the latter but to open the same when the liquid fuel has come into the inlet side first diffusion chamber 212.

Figure 6:
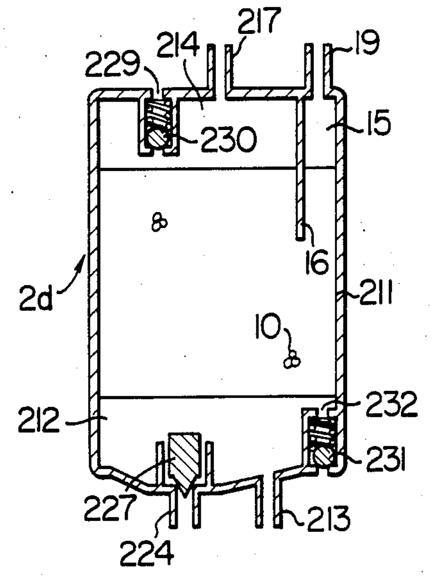
FIG. 6 is a vertical sectional view of a fourth embodiment of the invention.

Therefore, also in the fourth embodiment shown in FIG. 6, the fuel gas generated in the fuel tank 1 is introduced into the inlet side first diffusion chamber 212 through the first fuel gas passage 3 and through the tank port 213 formed in the canister 2d. The liquid phase suspended by the fuel gas, if any, is accumulated in the bottom of the first diffusion chamber 212 and only the gaseous phase of the fuel is trapped by the absorbent 10. Thus, the first diffusion chamber 212 in this embodiment serves as a separation chamber.

The advantages of the invention described herein before can be enjoyed also in the modifications of the described embodiments having the following additional features.

(1) A modification in which a check valve for contolling the flow rate is disposed in the passage between the fuel tank 1 and the adsorbent 10.

(2) A modification in which a check valve or an orifice for controlling the flow rate is disposed in the passage between the adsorbent 10 and the fuel gas pick-up port 8.

(3) A modification in which a supporting wall for preventing the float valve 127,227 is disposed around the float valve in such a manner as not to impair the smooth movement of the float valve 127,227.

(4) A modification in which, in order to prevent the accidental opening of the float valve 127,227, a spring is disposed between the upper end of the float valve and the casing 111,211 or between the upper end of the float valve and a wall extending from the casing 111,211 and overhanging the float valve.

(5) A modification in which the outer vent port 19, first partition wall 16, inlet side third diffusion chamber 15, second fuel gas passage 5 and the stop valve 6 are omitted from the cabister *2a,2b,2c, 2d*.

EXPLANATION OF OPERATION

Assume here a canister in which the tank port communicating with the fuel tank is disposed in an upper portion of the casing so as to open to a diffusion chamber defined between the casing wall and the absorbent. In this type of canister, as shown in FIGS. 4 and 5, the diffusion chamber is divided by the second wall 20 into a separator chamber 21,121 isolated from the absorbent 10 and the inlet side first diffusion chamber 12, the first diffusion chamber 12 being communicated with the separator chamber 21,121 through a second passage 22 provided in the second partition wall 20 and having one end opening to an upper portion of the space in the separator chamber. With this arrangment, the liquid fuel which has been introduced into the canister *2a, 2b, 2c* accompanying the fuel gas generated in the fuel tank is temporarily stored in the lower portion of the separator chamber 21,121, so that only the gaseous phase of the fuel having the smaller specific weight is trapped by the absorbent 10 through the first passage 22.

In the embodiment shown in FIG. 5, the separator chamber 121 is communicated through a second passage 126 provided at the bottom thereof with a liquid fuel reservoir 125 which is isolated from the absorber 10 by a third partition wall 23 and provided with an outlet port 24 communicated with the liquid portion in the fuel tank. The opening of the second passage adjacent to the separator chamber is normally closed by a float valve 127 which is adapted to float when a predetermined liquid level is reached in the separator chamber 121. With this arrangement, it is possible to return the liquid fuel to the fuel tank, even when a large quantity of liquid fuel has rushed into the canister.

In the case of the canister *2d* of the type shown in FIG. 6 in which the tank port 213 is disposed at the lower portion of the casing 211 and made to open to the inlet side first diffusion chamber 212 defined between the casing and the absorbent 10, an outlet port 224 for returning the liquid fuel to the liquid portion in the fuel tank is disposed at the bottom portion of the inlet side first diffusion chamber 212. The outlet port 224 is normally closed by a float valve 227 which is adapted to float and open when a predetermined liquid level is reached in the first diffusion chamber 212.

With this arrangement, the liquid fuel brought into the canister accompanying the fuel gas is separated from the latter when it passes through the separator chamber 21,121 or the inlet side first diffusion chamber 212 disposed at the upstream side of the absorbent 10, and is temporarily stored in such chamber. As a predetermined liquid level is reached in the chamber, the float valve 127,227 is made to float above the outlet port 126,224 to permit the liquid fuel to be discharged into the liquid fuel reservoir 125 or to the fuel tank.

What is claimed is:

1. A system for preventing loss of liquid fuel due to evaporation comprising: a casing accommodating a fuel gas absorbent and provided with a tank port in its upper portion communicating with a liquid fuel tank; a passage defined in said casing and providing a communication between said tank port and said absorbent; a separator chamber disposed in said passage, said passage being so constructed as to permit only the gaseous phase of the fuel to flow towards said absorbent; and a heat transmitting wall separating said absorbent from any liquid fuel in said chamber, said wall being adapted to enhance the vaporization of any such fuel by the heat of absorption developed in said absorbent.

2. A system for preventing loss of liquid fuel due to evaporation comprising: a casing accommodating a fuel gas absorbent and provided with a tank port in its upper portion communicating with a liquid fuel tank; a first passage defined in said casing and providing a communication between said tank port and said absorbent; a separator chamber disposed in said first passage, said first passage being so constructed as to permit only the gaseous phase of the fuel to flow towards said absorbent; a second passage provided in the bottom of said separator chamber and opening in a portion isolated from said absorbent; a float valve normally closing the opening of said second passage, said float valve being adapted to open said second passage when a predetermined liquid level is reached in said separator chamber; and a heat transmitting wall separating said absorbent from any liquid fuel in said chamber, said wall being adapted to enhance the vaporization of any such fuel by the heat of absorption developed in said aborbent.

* * * * *